United States Patent Office 3,019,118
Patented Jan. 30, 1962

3,019,118
COMPOSITION FOR ANTI-CORROSION COATING AND METHOD OF PREPARING SAME
Alphonse Raymond Wallen, Chicago, Ill., assignor to Dearborn Chemical Company, Chicago, Ill., a corporation of Illinois
No Drawing. Filed June 29, 1959, Ser. No. 823,331
7 Claims. (Cl. 106—123)

The present invention is directed to an improved coating composition for anti-corrosion coatings on metal and the like, and to a process for the manufacture of such coating compositions.

The compositions of the present invention are particularly applicable to the painting of metal surfaces to protect those surfaces against oxidation. The composition may or may not contain a pigment. In the preferred embodiment of the invention, the coating composition contains aluminum flakes. This type of composition is particularly useful for coating bridges or other structures constantly exposed to the elements. Not only do the compositions of the present invention exhibit excellent adhesion to metal surfaces, but they have a unique "self-cleaning" feature whereby the weathered surface of the coating composition is cleaned by rainfall and retains its metallic luster for very extended periods.

Another important characteristic possessed by the compositions is their penetrating ability. The coating compositions can be applied to exposed surfaces with a minimum of surface pre-treatment, and because of their penetrating power, they can penetrate beneath corrosion deposits and lift those deposits from the surface.

A very important feature of the improved compositions is their thixotropic property. This feature is important because it prevents settling of pigments during storage, thus preventing caking of the pigments. In addition, the gel which sets up on the metal surfaces during spraying can be built up readily into a thick coating for better corrosion protection.

An object of the present invention is to provide improved coating compositions for providing anti-corrosion coatings on metals.

Another object of the invention is to provide a self-cleaning coating composition containing aluminum flakes or the like.

A further object of the invention is to provide a coating composition which is thixotropic, that is, it normally exists in the form of a gel but it is easily converted to a liquid by simply stirring the gel.

Another object of the invention is to provide an anti-corrosion coating composition having excellent penetrating properties.

A further object of the present invention is to provide an improved method for the manufacture of coating compositions having the characteristics noted above.

I have found that a very remarkably improved paint or coating base results when zinc oxide is reacted with a fatty acid material having a titer, i.e., a solidification point of at least 75° F. and preferably in a range from 75° F. to 120° F. Sufficient zinc oxide is added to neutralize completely the fatty acids present in this type of material and leave a slight excess. This reaction product, in combination with a hydrocarbon vehicle such as "oleum spirits" or other petroleum based hydrocarbons provides a thixotropic gel which provides a vastly improved base for pigments such as aluminum flakes, iron oxide, carbon black, titanium dioxide, chromium oxide, and similar pigments. The resulting coating exhibits remarkable adhesion to metals, is very easy to apply by brushing or spraying and possesses the self-cleaning feature previously noted.

As the fatty acid material, I prefer to use a heads fraction from tall oil distillation consisting predominantly of fatty acids. Generally, these materials contain a complex mixture of saturated fatty acids including stearic acid in amounts of from about 10 to 30%, unsaponifiables from about 10 to 55%, and unsaturated fatty acids (e.g. oleic and linoleic) from about 40 to 80%. Some small amount of rosin acids, on the order of 2% or less, may also be present in the heads. These materials are commercially available products sold by various distributors. In order to secure the proper physical characteristics, however, it is important that the titer value of the fatty acid material be at least 75° F. The following table lists the characteristics of some commercially available tall oil heads which I have successfully employed in making the improved coating composition of this invention:

ACINTOL HEADS #1112

| | |
|---|---|
| Color (Gardner) | 11–13 |
| Acid number | 160–170 |
| Rosin acids percent | 0.1–1.5 |
| Unsaponifiables do | 13–25 |
| Moisture do | 0–0.3 |
| Titer ° F | 90–98 |

ACINTOL HEADS #2122

| | |
|---|---|
| Color (Gardner) | 11–13 |
| Acid number | 80–120 |
| Rosin acids percent | 0.1–1.5 |
| Unsaponifiables do | 30–55 |
| Moisture do | 0–0.3 |
| Titer ° F | 78–94 |

CROFATOL P-1

| | |
|---|---|
| Color (Gardner) | 9–12 |
| Acid number | 145–160 |
| Rosin acids percent | 0.3–2.0 |
| Unsaponifiables do | 20–35 |
| Moisture do | 0–0.2 |
| Titer ° F | 77–104 |

UNITOL DH

| | |
|---|---|
| Acid number | 160–180 |
| Rosin acids percent | 0.1–1.0 |
| Unsaponifiables do | 17–24 |
| Titer ° F | 117 |

The tall oil heads represent the preferred starting material because they are available commercially with the proper titer values, and are quite inexpensive. However, it is also possible to employ the fatty acids themselves along with a suitable drying oil, provided the fatty acids have the proper titer value.

The zinc oxide employed can be any of the high grade commercially available zinc oxide compositions such as "Azo 222-55" containing a minimum of 98.7% zinc oxide, from 0.2 to 0.35% zinc sulfate, from 0 to 0.1% lead sulfate, from 0 to 0.15% cadmium oxide, and having an acidity (as $SO_3$) of 0.05 to 0.15%.

In making up the compositions of the present invention, the fatty acid material is combined with a hydrocarbon vehicle such as oleum spirits or other petroleum base solvents. A typical properties chart for oleum spirits is given in the following table:

| | | |
|---|---|---|
| Initial boiling point | ° F | 304 |
| 50% distillation | ° F | 330 |
| End point | ° F | 360 |
| A.P.I. gravity | | 49.5–50.5 |

Generally, about 50 to 60 parts by weight of the fatty acids materials are combined with 20 to 30 parts by weight of oleum spirits or other vehicle. After mixing, the mixture is heated to a temperature of about 115 to 120° F. Then, the suitable amount of zinc oxide is added, determined by the amount required to neutralize completely the free fatty acids present. Generally, it is advisable to add a slight excess, say 2 to 3%, over the amount of zinc oxide stoichiometrically required for complete neutralization. The mixture containing the zinc oxide is then cooked at temperatures ranging up to 160° F., preferably on the order of 110 to 120° F., until substantial neutralization of the free fatty acid material occurs. Normally this might require from 15 minutes to an hour, with 20 to 30 minutes being typical. With fatty acid materials having low titers, on the order of 75 to 90° F., the reaction temperature should be held below about 125° F. On higher titer material, having titer values above 90° F., the reaction temperature can be higher but should not exceed 160° F.

After the neutralization of the acids has occurred, the pigment is added. For this use, I prefer to use a high quality aluminum flake paste such as "Reynolds No. 30" paste having the following characteristics:

| | |
|---|---|
| Non-volatiles | 65% minimum. |
| Screen retention, 325 mesh | 1.0% maximum. |
| Moisture | 0.1% maximum. |
| Solvent | Mineral spirits. |
| Bulking value | 0.081 gal./lb. |

Aluminum powder is also suitable, but is considerably more difficult to handle than the paste.

After the addition of the pigments, the mixture is agitated until a uniform composition occurs at a temperature of about 110 to 120° F. Then, the mixture is cooled below a temperature of 115° F. to provide a thixotropic gel which is readily converted into a liquid by stirring.

The compositions can also be prepared by varying the order of the steps mentioned above. Thus, the tall oil heads may be combined first with the zinc oxide, followed by the addition of the mineral spirits and the pigment.

The relative amounts of the ingredients of the composition can be varied somewhat, as long as the thixotropic gel is obtained. Thus, one may use from 50 to 60 parts by weight of tall oil heads with from 5 to 10 parts by weight of zinc oxide and sufficient hydrocarbon vehicle to provide the required consistency for coating. When a pigment is added, 1 to 10 parts by weight of the pigment powder or paste will normally be sufficient. As mentioned previously, it is desirable to add a slight excess of the zinc oxide beyond that stoichiometrically required to neutralize the free fatty acids completely, as apparently this excess zinc oxide serves to neutralize any acid deterioration products which occur during the reaction and subsequently in the coating during weathering.

The following specific examples illustrate the method for preparing the compositions.

Example I 58.0 parts by weight of "Acintol 2122" were combined with 27.3 parts by weight of oleum spirits and heated with mixing to a temperature of 115 to 120° F. 8.7 parts by weight of zinc oxide were added and the mixture was cooked at 115 to 120° F. for 20 to 30 minutes. The aluminum paste pigment, in an amount of 6 parts by weight was then added in and the mixture was mixed until uniform, while maintaining a temperature of 115 to 120° F. The product was then cooled and was ready for packaging.

Example II

A mixture was made up of 203 pounds of tall oil heads having a titer of 90° F. with 95.5 pounds of oleum spirits. The mixture was heated to 105° F. Then, 30.5 pounds of zinc oxide were added slowly with thorough mixing. The product was mixed for an additional 20 minutes. During this time, the temperature went up to 135° F. by the heat of the reaction in making the zinc soap. After the reaction had occurred, 21.0 pounds of aluminum paste was added at the time when the temperature was 130° F. The product was mixed for an additional 20 minutes. An additional six pounds of oleum spirits was then added to make up for evaporation loss. The product was then drained through a screen into an open head drum. The mixture was allowed to gel overnight. After mixing for five minutes, the Brookfield viscosity was found to be 5500 centipoises (cps.).

Brookfield viscosity measurements on various samples produced according to the procedures outlined above, measured at 77° F., ranged from 3000 to 9000 cps.

Example III

About 8.7 parts by weight of zinc oxide were added to about 58.0 parts by weight of "Acintol 2122," and heated to a temperature of 115 to 120° F., for about 30 minutes. About 27 parts by weight of a petroleum distillate having a boiling range of about 300–360° F. were added and mixed into the reaction mixture, followed by the addition of about 6 parts by weight of finely divided red iron oxide powder, both being added while the temperature was still about 115° F. After cooling, the red product was ready for packaging.

The coatings which result from the use of the coating compositions of this invention have been found to be very suitable for painting steel structures which are constantly exposed to weather. The coating is thermoplastic, and so expands and contracts with the metal. It retains its plasticity for extremely long periods so that flaking tendencies are minimized. This effect is probably due to the anti-oxidant properties of the zinc soaps present. The same properties are demonstrated by the fact that the coating does not form a skin in containers, even when partially full. The product is self-cleaning so that it retains its luster by continued exposure to the weather. The product provides some cathodic protection for a metal. The liquefied gel is a free flowing product which is easy to package. The coating is long lasting and serves as a very effective corrosion inhibitor. Finally, the product is easy to manufacture and is quite inexpensive.

It will be evident that various modifications can be made to the described embodiments without departing from the scope of the present invention.

I claim as my invention:

1. A coating composition consisting essentially of a thixotropic mixture of a liquid hydrocarbon vehicle and a reaction product of zinc oxide and a tall oil heads fraction having a titer between 75° and 120° F., said tall oil fraction containing from about 10% to 30% saturated fatty acids, from about 10% to 55% unsaponifiables, from about 40% to 80% unsaturated fatty acids, and rosin acids not in excess of about 2%, the amount of zinc oxide present being at least sufficient stoichiometrically for complete neutralization of the free fatty acids present.

2. A coating composition according to claim 1 which also includes a pigment.

3. A coating composition according to claim 1 which also includes an aluminum pigment.

4. A coating composition consisting essentially of a thixotropic mixture of a liquid hydrocarbon vehicle and a reaction product of zinc oxide and a tall oil heads fraction having a titer between 75° and 120° F., said tall oil fraction containing from about 10% to 30% saturated fatty acids, from about 10% to 55% unsaponifiables, from about 40% to 80% unsaturated fatty acids, and rosin acids not in excess of about 2%, the amount of zinc oxide present being at least sufficient stoichiometrically for complete neutralization of the free fatty acids present, said composition having a Brookfield viscosity, at 77° F., in the range from about 3,000 to 9,000 centipoises.

5. A coating composition consisting essentially of a thixotropic mixture of a liquid hydrocarbon vehicle and a reaction product of 5 to 10 parts by weight of zinc oxide and 50 to 60 parts by weight of a tall oil heads fraction having a titer between 75° and 120° F., said tall oil fraction containing from about 10% to 30% saturated fatty acids, from about 10% to 55% unsaponifiables, from about 40% to 80% unsaturated fatty acids, and rosin acids not in excess of about 2%, the amount of zinc oxide present being at least sufficient stoichiometrically for complete neutralization of the free fatty acids present.

6. The method of preparing a coating composition which comprises mixing a liquid hydrocarbon vehicle with a tall oil heads fraction having a titer between 75° and 120° F., said tall oil fraction containing from about 10% to 30% saturated fatty acids, from about 10% to 55% unsaponifiables, from about 40% to 80% unsaturated fatty acids, and rosin acids not in excess of about 2%, adding an amount of zinc oxide at least sufficient stoichiometrically to neutralize the free fatty acids present, cooking the resulting mixture at a temperature not in excess of 160° F. for a period of from 15 minutes to 1 hour, and cooling the resulting product to provide a thixotropic gel.

7. The method of preparing a coating composition which comprises mixing a liquid hydrocarbon vehicle with a tall oil heads fraction having a titer between 75° and 120° F., said tall oil fraction containing from about 10% to 30% saturated fatty acids, from about 10% to 55% unsaponifiables, from about 40% to 80% unsaturated fatty acids, and rosin acids not in excess of about 2%, adding an amount of zinc oxide at least sufficient stoichiometrically to neutralize the free fatty acids present, cooking the resulting mixture at a temperature not in excess of 160° F. for a period of from 15 minutes to 1 hour, adding a pigment to the cooked mixture, and cooling the resulting product to provide a thixotropic gel.

References Cited in the file of this patent

UNITED STATES PATENTS

| | | |
|---|---|---|
| 2,326,120 | Black | Aug. 10, 1943 |
| 2,402,903 | Massey et al. | June 25, 1946 |
| 2,418,075 | Kollen et al. | Mar. 25, 1947 |
| 2,587,268 | Roberts | Feb. 26, 1952 |
| 2,673,838 | Veatch et al. | Mar. 30, 1954 |
| 2,797,168 | Gimler | June 25, 1957 |